US006307838B1

United States Patent
Haas

(10) Patent No.: US 6,307,838 B1
(45) Date of Patent: Oct. 23, 2001

(54) METHOD FOR DETERMINING THE REQUIRED LOAD CAPACITY FOR A NUMBER OF COMMUNICATION CONNECTIONS WHICH CAN BE STATISTICALLY MULTIPLEXED

(75) Inventor: Ulrich Haas, Fürstenfeldbruck (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/655,282

(22) Filed: Sep. 5, 2000

Related U.S. Application Data

(63) Continuation of application No. PCT/DE98/03563, filed on Dec. 3, 1998.

(51) Int. Cl.[7] ............................ G01R 31/08; H04L 12/56
(52) U.S. Cl. ........................ 370/233; 370/252; 370/395
(58) Field of Search ................................. 370/230, 231, 370/232, 233, 252, 253, 254, 255, 395, 392, 389, 420, 468, 465

(56) References Cited

U.S. PATENT DOCUMENTS

| | | |
|---|---|---|
| 5,548,581 | 8/1996 | Makrucki . |
| 5,878,029 | * 3/1999 | Hasegawa et al. ................... 370/236 |
| 5,978,356 | * 11/1999 | Elwalid et al. ....................... 370/230 |
| 6,041,039 | * 3/2000 | Kilkki et al. .......................... 370/230 |
| 6,094,418 | * 7/2000 | Soumiya et al. ..................... 370/231 |

FOREIGN PATENT DOCUMENTS

| | | |
|---|---|---|
| 0 433 699 A2 | 6/1991 | (EP) . |
| 0 584 029 A2 | 2/1994 | (EP) . |
| 0 584 029 A3 | 2/1994 | (EP) . |

OTHER PUBLICATIONS

"ATM–Infrastruktur Für die Hochleistungskommunikation" [ATM Infrastructure for High–Performance Communication], pp. 148–150.

"A Traffic Control Method for Service Quality Assurance in an ATM Netwoek" (Abe et al.), 8272 IEEE Journal on Selected Areas in Communications, vol. 12, No. 2, 1994, pp. 322–331.

* cited by examiner

*Primary Examiner*—Alpus H. Hsu
*Assistant Examiner*—Duc Ho
(74) *Attorney, Agent, or Firm*—Herbert L. Lerner; Laurence A. Greenberg; Werner H. Stemer

(57) ABSTRACT

A method for controlling an acceptance or refusal of a new connection on an ATM communication device with a maximum capacity $R_{max}$ and is already handling M connections which can be statistically multiplexed. The new connection has a peak cell rate PCR and an average sustainable cell rate SCR. The method determines a sum $P_{M+1}=\Sigma PCR_i$ of the peak cell rates PCR and a sum $S_{M+1}=\Sigma SCR_i$ of the average sustainable cell rates SCR of the existing connections M and the new connection. A variance V of the cell rates of the M+1 connections is determined and a required capacity $load_{M+1}$ for the M connections is determined in dependence on PM, SM and V, and the new connection is accepted if $load_{M+1}$ is less than or equal to $R_{max}$. The connection acceptance control can be carried out faster, more effectively and independently of the sequence of accepted connections by the exact calculation of the required capacity of the communication connections.

19 Claims, 2 Drawing Sheets

METHOD FOR DETERMINING THE REQUIRED LOAD CAPACITY FOR A NUMBER OF COMMUNICATION CONNECTIONS WHICH CAN BE STATISTICALLY MULTIPLEXED

CROSS-REFERENCE TO RELATED APPLICATION

This is a continuation of International Application No. PCT/DE98/03563, filed Dec. 3, 1998, which designated the United States.

BACKGROUND OF THE INVENTION

Field of the Invention

The invention relates to a method for calculating the required bit rate of a number of communication connections that can be statistically multiplexed. The invention further relates to a method for controlling an acceptance or refusal of a new connection on an ATM communication device with a capacity $R_{max}$ that is already handling M connections that can be statistically multiplexed.

In the asynchronous transfer mode (ATM), data are transmitted independently of the information represented by them (voice communication, data communication, multimedia) in cells of 5 bytes (48 bytes of useful data and 5 bytes of control data). The network resources of a communication device, such as for example a multiplexer, a line or a switching matrix, are in this case shared by connections with different grade-of-service and bit-rate requirements. At the same time, it must be ensured by a so-called traffic control that, in spite of the joint transmission of data cells of various origin, various bit rates and various bit rate statistics, the required grade of transmission performance of the ATM layer is ensured. In particular, it must be ensured that the probability of cell loss is very low, for example less than $10^{-10}$, and that transmission time variations of the cells do not exceed a certain value.

In an ATM network, various types of connection are possible, distinguished by their bit rate statistics. A connection with a constant bit rate or deterministic bit rate has a fixed transmission bit rate (cell rate) over the entire duration of the connection. This bit rate must be constantly provided by the network. This type of connection is particularly suitable for real-time applications, such as voice communication for example, in which strict requirements are imposed on the cell delay variations and which have a virtually constant transmission rate.

A further type of connection is the available bit rate, the data being transmitted according to the network capacity available at a given time. This type of connection is not suitable for real-time applications, but for example as a low-cost data transmission, such as e-mail for example.

With the statistical bit rate type of connection, the data to be transmitted are transmitted on a virtual connection with a transmission rate varying over time. Examples of such a type of connection are video connections in which the video signals are encoded with a variable bit rate and voice communication with pause suppression and certain data transmission services. Connections with a statistical bit rate, in which the average bit rate is significantly below the maximum bit rate are suitable for statistical multiplexing. In this case, many connections are carried with a statistical bit rate over a common line or a common switching matrix, it not being necessary for each individual connection to reserve the maximum bit rate, since many uncorrelated connections with a low average bit rate in comparison with the maximum bit rate share the available transmission capacity on average. It is thus possible to "overbook" the line to a certain extent. The network infrastructure can be better utilized overall in this way.

To enable the network operator to provide adequate capacity for a number of communication connections with a statistical bit rate that are independent of one another, the maintenance of certain traffic parameters must be ensured by technical precautionary measures at the terminal devices or the like in a so-called traffic agreement. The traffic agreement regulates among other things the maximum bit rate (or peak cell rate, PCR) and the average bit rate or corresponding average sustainable cell rate (SCR). The peak cell rate PCR in this case gives the maximum number of ATM cells per unit of time taken up by the connection and the average sustainable cell rate SCR gives the average number of ATM cells per unit of time permissible over a prolonged period of time.

The problem with the connection acceptance control of connections which can be statistically multiplexed, i.e. connections with a statistical bit rate for which the ratio of the maximum bit rate to the average bit rate is above a certain value, is that it is necessary to avoid cell losses, which may occur due to the simultaneous transmission of many connections at a high bit rate. It is also necessary to make it possible for the ATM connection or the ATM communication device to be utilized to the greatest possible extent. Various connection acceptance methods of this kind are known.

One possibility is to reserve the peak cell rate PCR for each communication connection. Consequently, cell losses caused by overloading of the communication connection cannot occur, but the advantages of statistical multiplexing, i.e. the better utilization of the communication device by connections with a varying cell rate that are independent of one another cannot be exploited.

If, on the other hand, only the average sustainable cell rate SCR is reserved for each connection, intolerable cell losses occur even when there are small variations in the overall cell rate. Only when there is a very high number of connections that are independent of one another does the capacity required for transmission of the connections without any cell loss come close to the sum of the average sustainable cell rates of the individual connections.

One known method for controlling the acceptance of connections which can be statistically multiplexed is the so-called sigma rule, which is described in European Patent EP 0 433 699 B1 and in a reference by Rathgeb, Wallmeier titled "ATM-Infrastructur für die Hochleistungskommunikation" [ATM Infrastructure For High-Performance Communication], pages 148 to 150. In this method, an additional connection is still accepted along with a number M of already existing connections if an upper estimate of the transmission bit rate necessary for the transmission of the M+1 connections is less than or equal to the maximum bit rate $R_{max}$ of the communication device.

The estimate of the required capacity in the case of the sigma rule is given by the addition of the sum $S_{M+1} = \Sigma SCR_i$ of the average sustainable cell rates of the M+1 connections which can be statistically multiplexed to a factor $Q(R) * \sqrt{V_{M+1}}$, where $Q(R)$ is a quantile function which indicates the statistical behavior of the connections in dependence on the required bit rate, and V is an estimate of the variance of the bit rates of the M+1 connections.

If the capacity of a transmission device is shared with other types of traffic, for example traffic at an unspecified bit rate or available bit rate, the capacity R available for the traffic to be multiplexed is no longer known.

Until now, the sigma rule has been extended to cope with this problem and the capacity of the M already reserved connections used as the decision parameter for the acceptance of the M+1th connection. This capacity is iteratively increased when setting up further connections, to be precise by the average sustainable cell rate of the connection to be added if the sigma rule will accept the connection for this capacity, otherwise by the peak cell rate. By this procedure, the capacity determined is dependent on the setting-up sequence.

SUMMARY OF THE INVENTION

It is accordingly an object of the invention to provide a method for determining the required load capacity for a number of communications connections that can be statistically multiplexed which overcomes the above-mentioned disadvantages of the prior art methods and devices of this general type.

With the foregoing and other objects in view there is provided, in accordance with the invention, a method for determining load variables. The method includes the steps of providing an asynchronous transfer mode (ATM) communication device handling M connections that can be statistically multiplexed connections; and determining a required capacity $load_M$ for the M connections from equation $G_z$:

$$load_z = S_z + Q(load_z) * \sqrt{V_z} \text{ for } Z=M,$$

where:

$load_M$ is the required capacity of the M connections;
$S_M = \Sigma[SCR_i]$ with $1 \leq i \leq M$;
$Q(load_M)$ is a fixed function of the $load_M$; and
$V_M = \Sigma[SCR_i * (PCR_i - SCR_i)]$ with $1 \leq i \leq M$;
where $PCR_i$ is a peak cell rate of a connection with index i and $SCR_i$ is an average sustainable cell rate of the connection with the index i.

The invention is therefore based on the object of proposing a method for controlling the acceptance or refusal of the new connection of the ATM communication device with the given capacity $R_{max}$ that is independent of the sequence of the acceptance of the connections of the communication device.

The new connection is characterized by its peak cell rate PCR and its average sustainable cell rate SCR. By the method according to the invention, the sum $P_{M+1} = \Sigma PCR_i$ of the peak cell rates and the sum $S_{M+1} = \Sigma SCR_i$ of the average sustainable cell rates of the existing and new connections and the variance V of the cell rates are determined. In dependence on these variables, the required capacity $load_{M+1}$ of the M+1 connections is determined and the new connection is accepted if the required capacity $load_{M+1}$ is less than or equal to the maximum capacity $R_{max}$ of the ATM communication device.

By contrast with the known sigma rule, in the method according to the invention the overall required capacity $load_{M+1}$ is calculated exactly. It is not just determined whether or not a new connection can be set up. Consequently, the result achieved by the method according to the invention is independent of the sequence in which the connections are set up.

Since the required capacity is calculated, and consequently also the free capacity available at a given time, users or management centers of the communication device can be notified of this, making it possible for the network to be utilized more effectively.

In a variant of the method according to the invention, the connection is accepted if the minimum of the variables $load_{M+1}$ and $P_{M+1}$ is less than or equal to the maximum capacity $R_{max}$. If the calculated capacity $load_{M+1}$ is greater than the sum of the maximum bit rates $P_{M+1}$, it is sufficient to reserve the sum of the maximum bit rates $P_{M+1}$.

The required bit rate $load_M$ for M connections can be calculated with the assumption of a fictitious bit rate $R = SMX \ Q(R) \times \sqrt{V}$, where $Q(R)$ is a fixed, empirically determined so-called quantile function of R. The required bit rate $load_{M+1}$ is that fictitious bit rate R for which the relationship $$R = S_M + Q(R)\sqrt{V})$$

is satisfied.

The solution to this equation can be determined iteratively by suitable methods of approximation.

The quantile function $Q(R)$ can be chosen to be $q_1 + q_2/R$, the hyperbolic quantile $q_1$ and the hyperbolic factor $q_2$ of the associated sigma class being empirically determined by simulation calculations.

Then, $load_M$ can be determined by numerical extraction of the root $$load = x_0/2 + \sqrt{q_2 \cdot \sqrt{V} + x_0^2}$$

where x0 is equal to $q_1 \cdot \sqrt{V}$.

In accordance with an added feature of the invention, there is the step of accepting a new connection with an average sustainable cell rate $SCR_{M+1}$ if a fictitious capacity $load_{M+1}$ determined for the M connections and the new connection from the equation $G_z$ for Z=M+1, satisfies: $load_{M+1} \leq R_{max}$, where $R_{max}$ is a maximum capacity of the ATM communication device.

In accordance with another feature of the invention, there are the steps of determining $P_{M+1}$, $P_{M+1}$ being a sum of peak cell rates $PCR_i$ of the M connections and the new connection, and accepting the new connection if:

$$\text{minimum } (P_{M+1}, load_{M+1}) \leq R_{max}.$$

In accordance with another feature of the invention, the required capacity $load_M$ is continuously available, the new connection has a peak cell rate $PCR_{M+1}$ and the new connection is already accepted before determination of the fictitious capacity $load_{M+1}$ if:

$$load_M + PCR_{M+1} \leq R_{max},$$

and refusing the new connection without determination of the fictitious capacity $load_{M+1}$ if:

$$load_M + SCR_{M+1} > R_{max}.$$

In accordance with a further added feature of the invention, there is the step of defining $V_z$ as:

$$V_z = \Sigma[SCR_i * (PCR_i - SCR_i)]$$

where $PCR_i$ are peak cell rates of the M connections with $1 \leq i \leq Z$.

In accordance with a further additional feature of the invention, there is the step of defining $Q(load_z)$ as:

$$Q(load_z) = q_1 + q_2/load_z,$$

where $q_1$, is a hyperbolic quantile and $q_2$ is a hyperbolic factor.

In accordance with yet another feature of the invention, there is the step of determining a solution of the equation $G_z$ iteratively.

In accordance with another added feature of the invention there is the step of beginning an iteration at a starting point $$load_0 S_M + q_1 * \sqrt{V_z}$$

and $load_i$ is determined in each iteration step by $$load_i = S_z + (q_1 + q_2/load_{i-1}) * \sqrt{V_z}.$$

In accordance with another additional feature of the invention, there is the step of ending the iteration after an odd number of iteration steps.

In accordance with a different feature of the invention, there is the step of determining the required capacity $load_z$ by a solution of further equation $GW_z$:

$$load_z = x_0/2 + \sqrt{q_2 \cdot \sqrt{V_z} + x_0^2},$$

where $x_0 = q_1 * \sqrt{V_z}$.

With the foregoing and other objects in view there is further provided, in accordance with the invention, a method for determining load variables. The method includes the steps of providing an asynchronous transfer mode (ATM) communication device handling M connections which can be statistically multiplexed; and determining a still transmissible average sustainable cell rate $SCR_C$ of a new connection and a still transmissible peak cell rate $PCR_C$ of the new connection from equation $G_z$:

$$load_z = S_z + Q(load_z) * \sqrt{V_z} \text{ for } Z = C,$$

where:

loads $= SCR_C$;
$S_C = S_M + SCR_C$ with
$S_M = \Sigma[SCR_i]$ and $1 <= i <= M$;
$Q(load_c)$ is a fixed function of a capacity $load_c$;
$V_C = V_M + (SCR_c) * (PCR_C - SCR_C)$ with
$V_M = \Sigma[SCR_i * (PCR_i - SCR_i)]$ and $1 <= i <= M$;
$SCR_C = SCR_{MIN} + a * x$;
$PCR_C = PCR_{MIN} + x$;
 $a = (SCR_{M+1} - SCR_{MIN})/(PCR_{M+1} - PCR_{MIN})$
$x = PCR_C - PCR_{MIN}$;
$PCR_i$ is a peak cell rate of a connection with index i;
$SCR_i$ is an average sustainable cell rate of the connection with the index i;
$SCR_{M+1}$ is an average sustainable cell rate of the new connection;
$PCR_{M+1}$ is a peak cell rate of the new connection;
$SCR_{MIN}$ is an average minimum sustainable cell rate of the new connection; and
$PCR_{MIN}$ is a minimum peak cell rate of the new connection.

In accordance with a further feature of the invention, there is the step of determining the still transmissible average sustainable cell rate $SCR_C$ and the still transmissible peak cell rate $PCR_C$ if the new connection with the average sustainable cell rate $SCR_{M+1}$ and the peak cell rate $PCR_{M+1}$ is refused and would be accepted with the average minimum sustainable cell rate $SCR_{MIN}$ and the minimum peak cell rate $PCR_{MIN}$.

In accordance with a concomitant feature of the invention, there is provided an asynchronous transfer mode (ATM) communication device with a maximum capacity $R_{max}$. The communication device has a device for indicating a still available residual capacity $R_{rest}$ of the ATM communication device with M existing connections, where $R_{rest} = R_{max} - load_M$ the device being programmed for determining the $load_M$ for the M existing connections from equation $G_z$:

$$load_z = S_z + Q(load_z) * \sqrt{V_z} \text{ for } Z = M,$$

where:

$load_M$ is a capacity of the M existing connections;
$S_M = \Sigma[SCR_i]$ with $1 <= i <= M$;
$Q(load_M)$ is a fixed function of the $load_M$;
$V_M = \Sigma[SCR_i * (PCR_i - SCR_i)]$ with $1 <= i <= M$;
$PCR_i$ is a peak cell rate of a connection with index i; and
$SCR_i$ is an average sustainable cell rate of the connection with the index i.

Other features which are considered as characteristic for the invention are set forth in the appended claims.

Although the invention is illustrated and described herein as embodied in a method for determining the required load capacity for a number of communications connections which can be statistically multiplexed, it is nevertheless not intended to be limited to the de tail s shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
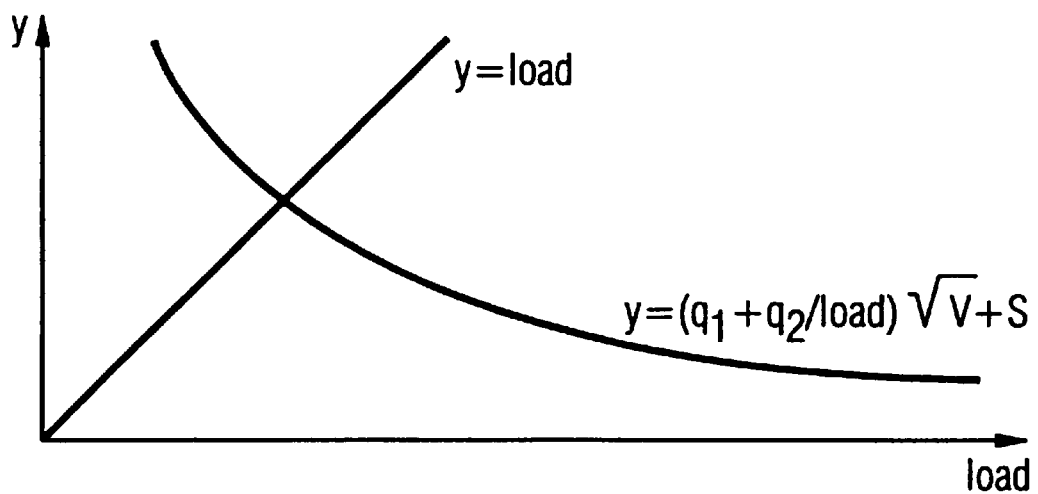
FIG. 1 is a graph to explain a calculation of a required capacity of a number of connections that can be statistically multiplexed according to the invention.

In all the figures of the drawing, sub-features and integral parts that correspond to one another bear the same reference symbol in each case. A communication device, such as for example a communication line, a switching matrix or the like, has an overall available capacity $R_{max}$, i.e. a connection with a constant bit rate $R_{max}$ can be accepted.

A number of M communication connections that can be statistically multiplexed are transmitted via the communication device, characterized by a peak cell rate (PCR) and an average sustainable cell rate (SCR). $P_M = \Sigma PCR_i$ then denotes the sum of the peak cell rates of the M connections and $S_M = \Sigma SCR_i$ denotes the sum of the average sustainable cell rates of the connections.

$$V = \Sigma SCR_i (PCR_i - SCR_i)$$

is an estimate of the variance of the cell rates of the M connections.

If $$S_M + \sqrt{V \cdot Q(R)} \leq R \quad (1)$$

is satisfied for a bit rate, this capacity is sufficient for all M connections to be accepted. In this case, Q(R) is an empirically determined quantile function. For Q(R), the function $q_1 + q_2/R$ is known as a good approximation, the factors $q_1$ and $q_2$ being determined by simulations and depending on the ratio of the peak cell rate to the average sustainable cell rate of the connections. $q_1$ is, for example, of the order of magnitude of 10, $q_2$ is of the order of magnitude of $10^5$. The inequation 1 can then be written as:

$$(q_1 + q_2/R) \cdot \sqrt{V} + S_M < R \quad (2)$$

The right and left sides of the inequation are graphically represented in FIG. 1. The function y(R)=R is a linear, monotonously rising function, while the function $y = q_1 + q_2/R \cdot \sqrt{V} + S_M$ falls hyperbolically with higher values of R. The intersection point of the two graphs is the value R=load, which gives the required capacity exactly (within the accuracy of the assumptions made). By determining the intersection R=load, the capacity required by the M connections which can be statistically multiplexed can consequently be determined exactly, while in the case of the sigma rule it is just determined whether or not a new connection can be accepted at a given time. The exact calculation of the overall capacity has the advantage that it does not depend on the sequence in which the connections are accepted. Furthermore, the required capacity, and consequently also the free capacity available at a given time, can be indicated and users of the communication device can be notified of it.

For the calculation of load, there are the following possibilities. On the one hand, the equation $$(q_1 + q_2/\text{load}) \cdot \sqrt{V} + S_M = \text{load} \quad (3)$$

can be resolved for load if $x_0 := q_1 \cdot \sqrt{V}$ is defined:

$$\text{load } x_0/2 + \sqrt{q_2 \cdot \sqrt{V} + x_0^2} \quad (4)$$

Figure 2:
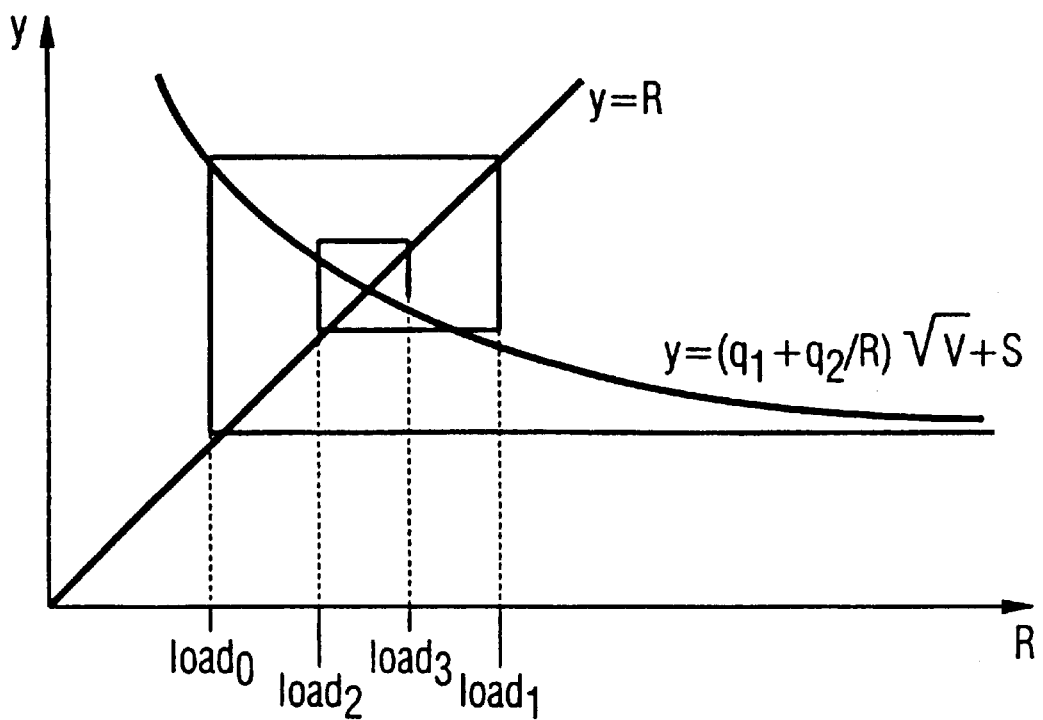
FIG. 2 is a graph to illustrate an iteration method for calculating the required capacity.

Alternatively, R=load can also be determined iteratively. The method is schematically represented in FIG. 2. From the starting point $\text{load}_0 = q_1 \cdot \sqrt{V} + S_M$, load is determined iteratively as $$\text{load}_{n+1} = (q_1 + q_2/\text{load}_n) \cdot \sqrt{V} + S_m \quad (5).$$

A C program for executing this algorithm is enclosed with the patent application as an annex. In $10^7$ calculations for the acceptance of a connection, the relative error of the load in three iterations was below $3 \times 10^{-4}$. An odd number of iteration steps ensures that the required capacity is overestimated and not underestimated. The exactly calculated capacity $\text{load}_M$ at a given time for M connections of the communication device can in turn be used for effective acceptance control of the communication device. Since the capacity $\text{load}_M$ required for M existing connections is continuously available, when there is a new request for a connection with a peak cell rate PCR and an average sustainable cell rate SCR, the connection can be accepted without further calculation if the free capacity $R_{max} - \text{load}_M$ is greater than PCR and can be refused without further calculation if $R_{max} - \text{load}_M$ is less than SCR. Only if the load of the communication device is in the range lying in between is a new calculation of the loade $\text{load}_{M+1}$ of the M+1 connections required before acceptance. As soon as the connection has been set up, the load calculation is extended to all the existing connections.

A further application of the present invention is explained with reference to FIG. 3.

In the case of a connection with a variable bit rate, it may be characterized not only by the peak cell rate F and average sustainable cell rate G but also by a peak cell rate required as a minimum $H_{min}$ and an average sustainable cell rate required as a minimum $I_{min}$. An example of this is a video telephone service, which requires a minimum transmission bandwidth of, for example, 64 KB per second to be able to build up a picture at all. A high bandwidth is desirable, but not absolutely necessary, for real-time transmission of the mimic or the like.

Figure 3:
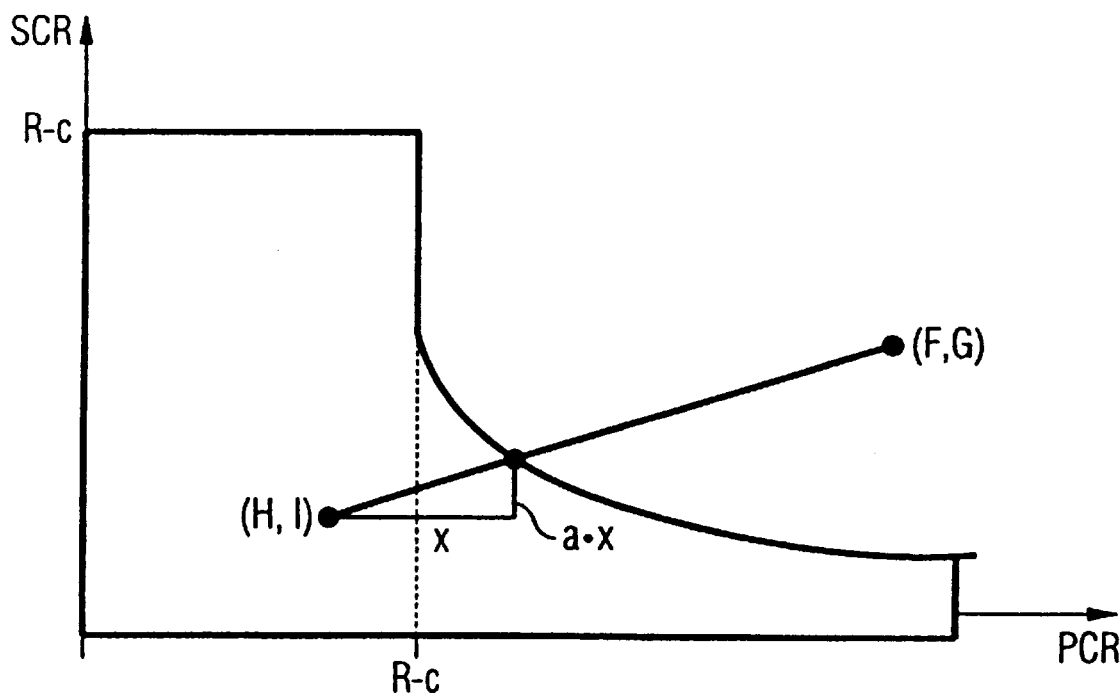
FIG. 3 is a graph to explain an application of the method according to the invention.

In FIG. 3, the average sustainable cell rate SCR is plotted against the peak cell rate PCR in a diagram. The peak cell rate F and the average sustainable cell rate G form the point (F, G) which characterizes the ideal state of the connection. The point (H, I) formed by the minimum cell rates $H_{min}$ and $I_{min}$, gives the minimum requirements for the connection. The task of the connection acceptance control is to accept the connection with a variable (as great as possible) bandwidth if it is ensured that the minimum conditions $H_{min}$, $I_{min}$ are always satisfied. This acceptance control can be realized on the basis of the exact calculation of the available capacity $\text{load}_M$.

If the combination of parameters at the edge of the gray area with the straight-line through (H, I) and (F, G) is assumed, the capacity available is fully utilized and the prescribed rates are taken well into account. a is the slope of the straight-line (H, I)–(F, G) and x is the difference between the peak cell rate sought and $H_{min}$. Then, the sought average sustainable cell rate c is obtained as the sum of the minimum cell rate and $a \cdot x$:

$$c = (q_1 + q_2/c) \cdot \sqrt{V + (I + a \cdot x)(H + x - (I + a \cdot x))} + S_M + I + a \cdot x \quad (6)$$

where x corresponds to the required capacity load and can be calculated from equations (3) and (5). Equation (6) is equivalent to a quadratic equation in x and can be calculated by suitable numerical iteration methods.

The invention makes possible for the first time an exact calculation of the required capacity $\text{load}_M$ of a number of M connections that can be statistically multiplexed, characterized by the peak cell rate PCR and the average sustainable cell rate SCR.

Figure 4:
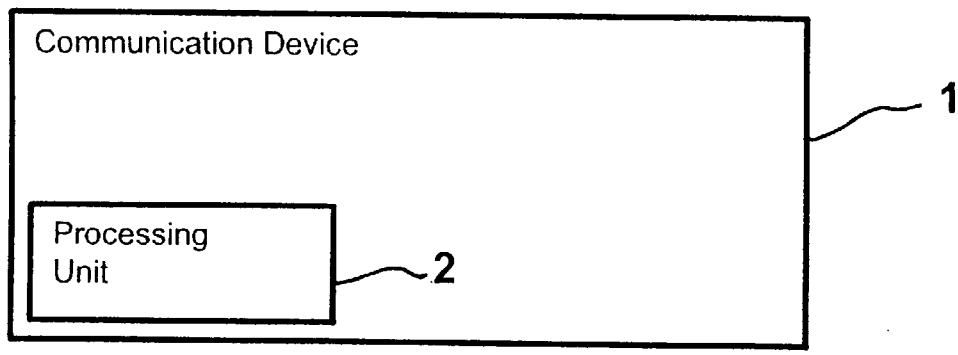
FIG. 4 is a block diagram of a communications device having a processor programmed to implement the method according to the invention.

FIG. 4 shows the ATM communication device 1 having a processing unit 2 programmed to implement the above-mentioned steps.

I claim:

1. A method for determining load variables, which comprises the steps of:
   providing an asynchronous transfer mode (ATM) communication device handling M connections being statistically multiplexed connections; and
   determining a required capacity $\text{load}_M$ for the M connections from equation $G_z$:

$$\text{load}_z = S_z + Q(\text{load}_z) * \sqrt{V_z} \text{ for } Z = M,$$

where:

$\text{load}_M$ is the required capacity of the M connections;
   $S_M = \Sigma[\text{SCR}_i]$ with $1 \leq i \leq M$;
   $Q(\text{load}_M)$ is a fixed function of the $\text{load}_M$; and
   $V_M = \Sigma[\text{SCR}_i * (\text{PCR}_i - \text{SCR}_i)]$ with $1 \leq i \leq M$;
   where $\text{PCR}_i$ is a peak cell rate of a connection with index i and $\text{SCR}_i$ is an average sustainable cell rate of the connection with the index i.

2. The method according to claim 1, which comprises accepting a new connection with an average sustainable cell rate $SCR_{M+1}$ if a fictitious capacity $load_{M+1}$ determined for the M connections and the new connection from the equation $G_z$ for Z=M+1, satisfies: $load_{M+1} <= R_{max}$, where $R_{max}$ is a maximum capacity of the ATM communication device.

3. The method according to claim 2, which comprises determining $P_{M+1}$, $P_{M+1}$ being a sum of peak cell rates $PCR_i$ of the M connections and the new connection, and accepting the new connection if:

$$\text{minimum } (P_{M+1}, load_{M 1+}) <= R_{max}.$$

4. The method according to claim 2, wherein the required capacity $load_M$ is continuously available, the new connection has a peak cell rate $PCR_{M+1}$ and the new connection is already accepted before determination of the fictitious capacity $load_{M+1}$ if:

$$load_M + PCR_{M+1} <= R_{max},$$

and refusing the new connection without determination of the fictitious capacity $load_{M+1}$ if:

$$load_M + SCR_{M+1} > R_{max}.$$

5. The method according to claim 1, which comprises defining $V_z$ as:

$$V_z = \Sigma[SCR_i*(PCR_i - SCR_i)]$$

where $PCR_i$ are peak cell rates of the M connections with $1 <= i <= Z$.

6. The method according to claim 1, which comprises defining $Q(load_z)$ as:

$$Q(load_z) = q_1 + q_2/load_z,$$

where $q_1$ is a hyperbolic quantile and $q_2$ is a hyperbolic factor.

7. The method according to claim 1, which comprises determining a solution of the equation $G_z$ iteratively.

8. The method according to claim 7, which comprises beginning an iteration at a starting point $$load_0 = S_M + q_1 * \sqrt{V_z}$$

and $load_i$ is determined in each iteration step by $$load_i = S_z + (q_1 + q_2/load_{i-1}) * \sqrt{V_z}.$$

9. The method according to claim 8, which comprises ending the iteration after an odd number of iteration steps.

10. The method according to claim 6, which comprises determining the required capacity $load_z$ s by a solution of further equation $GW_z$:

$$load_z = x_0/2 + \sqrt{q_2 \cdot V_z + x_0^2},$$

where $x_0 = q_1 * \sqrt{V_z}$.

11. A method for determining load variables, the method which comprises the steps of:

providing an asynchronous transfer mode (ATM) communication device handling M connections which can be statistically multiplexed; and determining a still transmissible average sustainable cell rate $SCR_C$ of a new connection and a still transmissible peak cell rate $PCR_C$ of the new connection from equation $G_z$:

$$load_z = S_z + Q(load_z) * \sqrt{V_z} \text{ for } Z=C,$$

where:
$load_c = SCR_c$;
$S_C = S_M + SCR_C$ with
$S_M = \Sigma[SCR_i]$ and $1 <= i <= M$;
$Q(load_C)$ is a fixed function of a capacity $load_C$;
$V_C = V_M + (SCR_C)*(PCR_C - SCR_C)$ with
$V_M = \Sigma[SCR_i*(PCR_i - SCR_i)]$ and $1 <= i <= M$;
$SCR_C = SCR_{MIN} + a*x$;
$PCR_C = PCR_{MIN} + x$;
$a = (SCR_{M+1} - SCR_{MIN})/(PCR_{M+1} - PCR_{MIN})$;
$x = PCR_C - PCR_{MIN}$;
$PCR_i$ is a peak cell rate of a connection with index i;
$SCR_i$ is an average sustainable cell rate of the connection with the index i;
$SCR_{M+1}$ is an average sustainable cell rate of the new connection;
$PCR_{M+}$ is a peak cell rate of the new connection;
$SCR_{MIN}$ is an average minimum sustainable cell rate of the new connection; and
$PCR_{MIN}$ is a minimum peak cell rate of the new connection.

12. The method according to claim 11, which comprise determining the still transmissible average sustainable cell rate $SCR_C$ and the still transmissible peak cell rate $PCR_C$ if the new connection with the average sustainable cell rate $SCR_{M+1}$ and the peak cell rate $PCR_{M+1}$ is refused and would be accepted with the average minimum sustainable cell rate $SCR_{MIN}$ and the minimum peak cell rate $PCR_{MIN}$.

13. The method according to claim 11, which comprises defining $V_z$ as:

$$V_z = \Sigma[SCR_i*(PCR_i - SCR_i)]$$

where $PCR_i$ are peak cell rates of the Z connections with $1 <= i <= Z$.

14. The method according to claim 11, which comprises defining $Q(load_z)$ as:

$$Q(load_z) = q_1 + q_2/load_z,$$

where $q_1$ is a hyperbolic quantile and $q_2$ is a hyperbolic factor.

15. The method according to claim 14, which comprises determining the capacity $load_z$ by a solution of a further equation $GW_z$:

$$load_z = x_0/2 + \sqrt{q_2 \cdot V_z + x_0^2},$$

where $x_0 = q_1 * \sqrt{V_z}$.

16. The method according to claim 11, which comprises determining a solution of the equation $G_z$ iteratively.

17. The method according to claim 16, which comprises beginning an iteration at a starting point $$load_0 = S_z + q_1 * \sqrt{V_z}$$

and $load_i$ is determined in each iteration step by $$load_i = S_z + (q_1 + q_2/load_{i-1}) * \sqrt{V_z}.$$

18. The method according to claim 17, which comprises ending the iteration after an odd number of iteration steps.

19. An asynchronous transfer mode (ATM) communication device with a maximum capacity $R_{max}$, comprising:

a device for indicating a still available residual capacity $R_{rest}$ of the ATM communication device having M existing connections, where $R_{rest}=R_{max}-load_M$, said device being programmed for determining the $load_M$ for the M existing connections from equation $G_z$:

$$load_z = S_z + Q(load_z) * \sqrt{V_z} \text{ for } Z=M, \qquad (5)$$

where:

$load_M$ is a capacity of the M existing connections;

$S_M = \Sigma[SCR_i]$ with $1<=i<=M$;

$Q(load_M)$ is a fixed function of the $load_M$;

$V_M = \Sigma[SCR_i*(PCR_i-SCR_i)]$ with $1<=i<=M$;

$PCR_i$ is a peak cell rate of a connection with index i; and $SCR_i$ is an average sustainable cell rate of the connection with the index i.

* * * * *